US012015667B2

(12) United States Patent
Tharuvai Sundaram et al.

(10) Patent No.: US 12,015,667 B2
(45) Date of Patent: Jun. 18, 2024

(54) SYNCHRONIZING USER DATA BETWEEN A SYNC CLIENT AND A SYNC SERVER ON A CUSTOMER COMPUTING SYSTEM

(71) Applicant: Hewlett Packard Enterprise Development LP, Houston, TX (US)

(72) Inventors: Venkateswaran Tharuvai Sundaram, Ft. Collins, CO (US); Sonu Sudhakaran, Bangalore (IN); Tejaswi Bangalore Rajeevalochanam, Bangalore (IN); Reubenur Rahman, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 495 days.

(21) Appl. No.: 17/227,445

(22) Filed: Apr. 12, 2021

(65) Prior Publication Data
US 2022/0329654 A1    Oct. 13, 2022

(51) Int. Cl.
*H04L 29/08* (2006.01)
*G06F 9/445* (2018.01)
(Continued)

(52) U.S. Cl.
CPC ...... *H04L 67/1095* (2013.01); *G06F 9/44526* (2013.01); *H04L 47/2475* (2013.01); *H04L 63/0442* (2013.01)

(58) Field of Classification Search
CPC ............. H04L 67/1095; H04L 47/2475; H04L 63/0442; H04L 67/10; H04L 67/1097; G06F 9/44526; G06F 8/658; G06F 9/455
(Continued)

(56) References Cited

U.S. PATENT DOCUMENTS 6,034,621 A     3/2000  Kaufman
7,299,290 B2 *  11/2007 Karpoff ............... H04L 67/1095
                                               348/E5.008
(Continued)

FOREIGN PATENT DOCUMENTS

CN          105893633 A       8/2016

OTHER PUBLICATIONS

A cloud environment for backup and data storage, Camacho et al, Feb. 2014 (Year: 2014).*

(Continued)

*Primary Examiner* — Jahangir Kabir
(74) *Attorney, Agent, or Firm* — Slater Matsil, LLP

(57) ABSTRACT

Example implementations relate to data synchronization. According to an example, a system includes a processing system to execute a workload container, the workload container including a user workload application, the user workload application including a sync client; a data storage system, coupled to the processing system, to store user data; and a sync controller to control synchronization of the user data between the sync client and a sync server executing on a customer computing system and pull a selected portion of the user data from the customer computing system to the sync client. The sync client incrementally updates the user data stored on the data storage system with the selected portion of the user data to synchronize the user data between the customer computing system and the cloud computing system.

11 Claims, 9 Drawing Sheets

(51) Int. Cl.
*H04L 9/40* (2022.01)
*H04L 12/859* (2013.01)
*H04L 47/2475* (2022.01)
*H04L 67/1095* (2022.01)

(58) Field of Classification Search
USPC .......................................................... 713/153
See application file for complete search history.

(56) References Cited

U.S. PATENT DOCUMENTS

| | | | |
|---|---|---|---|
| 8,341,363 B2 | 12/2012 | Chou et al. | |
| 9,141,410 B2 | 9/2015 | Leafe et al. | |
| 9,451,051 B1* | 9/2016 | Ray | H04L 67/131 |
| 10,567,501 B2* | 2/2020 | Lee | G06Q 50/06 |
| 2001/0049740 A1* | 12/2001 | Karpoff | H04N 21/472 |
| | | | 348/E5.008 |
| 2004/0054711 A1* | 3/2004 | Multer | H04L 67/1095 |
| | | | 709/201 |
| 2007/0162518 A1* | 7/2007 | Tian | H04L 9/3242 |
| 2010/0228768 A1* | 9/2010 | Yamasuge | G06F 16/273 |
| | | | 709/219 |
| 2015/0370827 A1* | 12/2015 | Parkison | G06F 16/178 |
| | | | 707/610 |
| 2016/0217294 A1* | 7/2016 | Hornquist Astrand | |
| | | | H04L 63/06 |
| 2018/0293493 A1 | 10/2018 | Kalamkar et al. | |

OTHER PUBLICATIONS

A. Andrei, "Speeding Up Network File Transfers with RSYNC," Jan. 3, 2019, pp. 1-15, Retrieved from the Internet on Dec. 16, 2020 at URL: <alibabacloud.com/blog/speeding-up-network-file-transfers-with-rsync_594337>.

A. Tridgell et al., "rsync man page," Feb. 25, 2021, pp. 1-63, Retrieved from the Internet on Apr. 1, 2021 at URL: <download.samba.org/pub/rsync/rsync.1>.

alternativeto.net, "rsync Alternatives for Linux," Mar. 14, 2021, pp. 1-4, Retrieved from Internet on Apr. 1, 2021 at URL: <alternativeto.net/software/rsync/?platform=linux>.

Hewlett Packard Enterprise, "Hewlett Packard Enterprise delivers the cloud experience everywhere with the general availability of HPE GreenLake Central," May 4, 2020, pp. 1-10, Retrieved from the Internet on Feb. 22, 2021 at URL: <hpe.com/us/en/newsroom/press-release/2020/05/hewlett-packard-enterprise-delivers-the-cloud-experience-everywhere-with-the-general-availability-of-hpe-greenlake-central.html>.

Hewlett Packard Enterprise, "HPE GreenLake Central User Guide: Adding User Images," Feb. 2021, pp. 1-4, Edition: 12.

Hewlett Packard Enterprise, "Virtual Machines Delivered as a Service," Jun. 2020, 1 page.

* cited by examiner

SYNCHRONIZING USER DATA BETWEEN A SYNC CLIENT AND A SYNC SERVER ON A CUSTOMER COMPUTING SYSTEM

BACKGROUND

Enterprise customers in cloud computing systems running data intensive compute workloads for complex research projects, such as artificial intelligence (AI), machine learning (ML), and data sciences, usually manage very large amounts of data. The data may be comprised of very large sets of structured data, textual data, binary data or a large number of small media files. This data changes over time due to data analysis, retraining of ML models, and other processing of the workloads.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
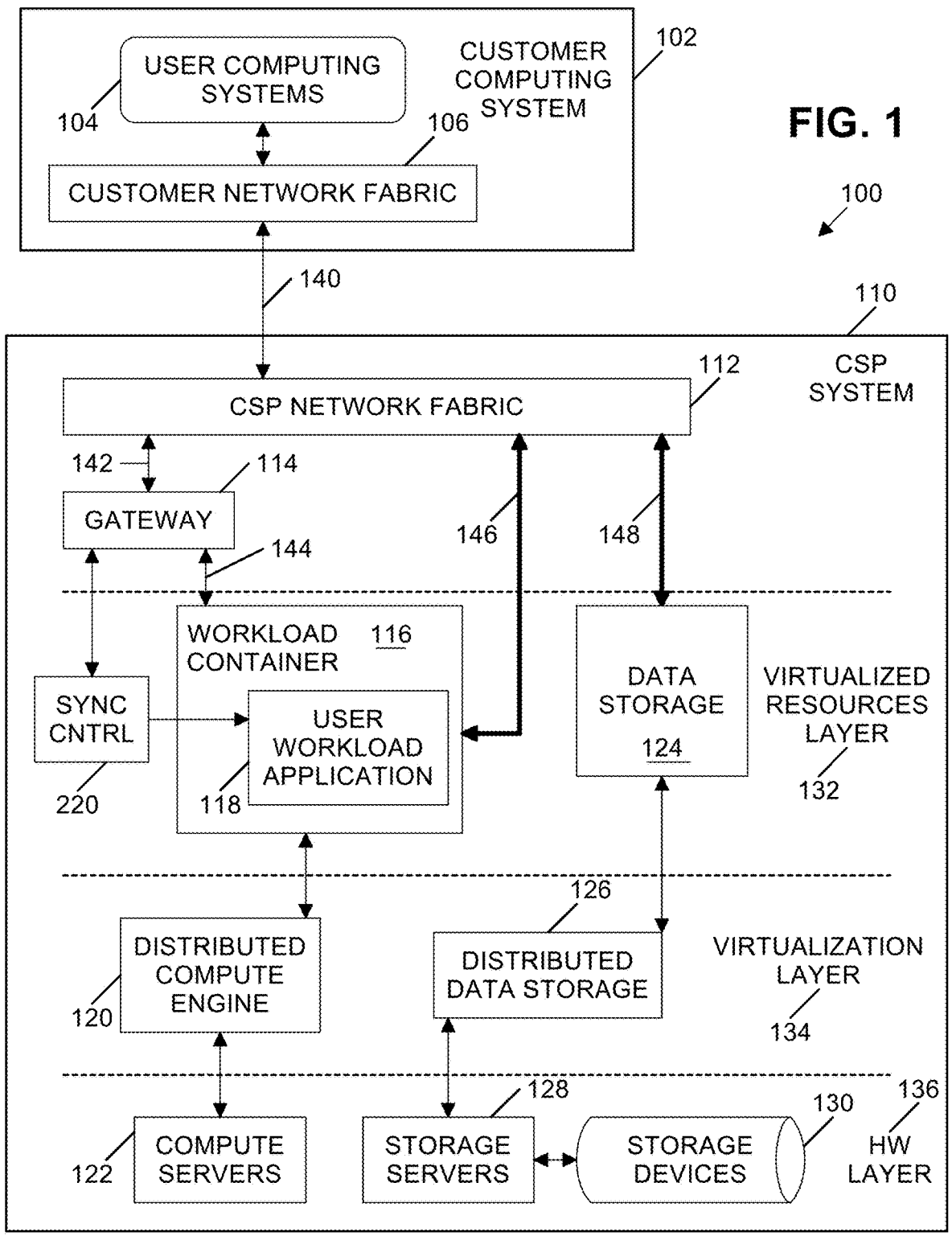
FIG. 1 is diagram of a computing system architecture according to some embodiments.

A greenfield computing environment is a portion of a cloud computing system where the data (e.g., greenfield data) and workloads are new and created during installation of the user's computing environment in the cloud computing system. A brownfield computing environment is where workloads existed prior to installation of the user's computing environment and there is data stored in other existing computing systems (e.g., brownfield data in the user's computing system) that needs to be brought into the newly created user's computing environment in the cloud computing system for subsequent processing.

Continually updating large amounts of data for such workloads can be problematic from a system performance perspective. Due to the high-performance computing nature of these workloads, it is advantageous that these data files are accessed with a low latency. One attempt to solve at least a part of this problem includes co-locating data along with the compute workloads in servers that are optimized for high capacity, low latency data accesses. While this approach might help address throughput problems for data in a greenfield computing environment, they do not alleviate performance issues for the huge amounts of existing brownfield data stored in brownfield computing environments. Further, the communications networks used to access the compute workloads (including network fabrics and interconnects) typically cannot be used for transferring such large data sets without negatively impacting overall system performance.

To address the foregoing issues, embodiments described herein are generally directed to systems and methods for efficiently synchronizing brownfield data in a cloud computing system.

Rather than pushing data over a high latency compute workload container network, embodiments pull data for the compute workloads over a reliable low-latency, high-bandwidth dedicated network. This provides separate access to the data and compute workload networks with predictable response times for the compute workload endpoints. Embodiments implement incremental synchronization updates instead of making full copies of data during updates. Embodiments implement a "pull" mechanism as an incremental remote synchronization so that incremental (e.g., delta) changes to source data (e.g., in the customer's computing system) are applied to destination data (e.g., in the cloud computing system). This avoids large volume recopies when only a few files in the source data might have changed. Embodiments provide for a secure handshake between a source and a destination for user data, such as brownfield data. Embodiments enable the user to employ secure private/public cryptographic keys so the user's computing system hosting the source data within a customer computing system trusts the destination of the data (e.g., the cloud computing system). This helps ensure the user is in control of what cloud computing system components can access portions of the user's data stored in brownfield computing environments resident in the customer's computing system.

Embodiments provide data update operations as a recurring job. Incremental synchronization of data in the cloud computing system is performed whenever there is a change to the source data (e.g., brownfield data). To enable this, embodiments provide the ability for the user to schedule recurring jobs that poll for any data updates and automatically synchronizes the incremental changes. Further, the job and its status are made visible to the user so that the user can pause or cancel the update if desired. Problems with data synchronization are automatically detected and alerted. The scheduled recurring jobs include log based alerting rules defined so that whenever a data transfer problem is detected (such as a network outage, a cloud computing system hosting the source data is down, etc.), the problem is automatically reported via an information technology (IT) service management tool.

In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

A "distributed system" generally refers to a collection of computing elements (also referred to herein as "nodes" or "processing nodes") that appears to its users (e.g., people or applications) as a single coherent system. The nodes of a distributed system may include components executed on or represented by different computer elements or computer systems that are coupled in communication and which communicate and coordinate their actions. The nodes of a distributed system interact with one another to achieve a common goal, for example, support and/or provision of a particular service. The nodes of a distributed systems may be coupled in communication via a communication link (e.g., a bus, a switch fabric, a wireless or wired network, or a combination thereof) and are typically spread over multiple failure domains to enhance service availability. For example, geographically distributed nodes may be coupled in communication via one or more private and/or public networks (e.g., the Internet). There are various types of distributed systems, including distributed computing systems, distributed information systems and distributed pervasive (or ubiquitous) systems. Examples of distributed computing systems, which are typically used for high performance computing tasks, include cluster and cloud computing systems and grid computing systems. Examples of distributed information systems, which are typically used for management and integration of business functions, include transaction processing systems and enterprise application integration. Examples of distributed pervasive (or ubiquitous) systems, which typically include mobile and embedded systems, include home systems and sensor networks.

A "service" generally refers to a process or function performed by or otherwise supported in whole or in part by a distributed system. For example, the nodes of the distributed system may make some contribution to a service provided by its user(s) (e.g., upstream systems or applications) in the form of providing, server services, storage services, storage networking services, computing resources, storage resources and/or networking resources on behalf of the user(s). Alternatively, the nodes of the distributed system may be responsible for and effectively represent the entirety of the service. Non-limiting examples of a service include a webservice, cloud management, cloud infrastructure services, a distributed application, a managed service, or transaction processing. Embodiments described herein may be particularly well-suited to services requiring strong consistency.

A "node" or "processing node" generally refers to a computing element. The nodes of a distributed system may be computer systems (e.g., clients, servers or peers) in virtual or physical form, one or more components of a computer system, computing elements, compute engines, hardware devices, software entities or processes, or a combination thereof. Non-limiting examples of nodes include a software process (e.g., a client or a server), a virtual machine, a virtual controller of a storage software stack, a storage server, a hyperconverged platform, a data virtualization platform, a sensor, or an actuator.

FIG. 1 is diagram of a computing system architecture 100 according to some embodiments. Customer computing system (CCS) 102 comprises one or more user computing systems 104. User computing systems 104 comprise any user-operated computing device, such as a personal computer (desktop, laptop or workstation), a smart phone, a tablet computer, a personal digital assistant (PDA), a server, and the like. Customer computing system 102 provides computing resources to the user computing systems 102. Customer computing system 102 may include one or more servers, personal computers, smart phones, tablet computers, PDAs, servers, storage devices, communications networks, network fabrics, interconnects, network interface cards, switches, routers, etc. In some embodiments, customer computing system 102 may be operated by an organization such as a business, an educational institution, a research facility, etc. In an embodiment, customer computing system 102 runs the Linux™ operating system. User computing systems 104 communicate outside customer computing system 102 via customer network fabric 106. A network fabric is a network topology where all nodes are interconnected to all other nodes. In some embodiments, customer network fabric 106 is communicatively coupled with other networks and/or network fabrics, such as intranets or the Internet (not shown). User computing systems 104 execute applications which may in some cases read data from and/or write data to other computing systems over customer network fabric 106.

Customer computing system 102 is coupled to cloud service provider (CSP) system 110 over external access communications link 140. In an embodiment, external access communications link 140 provides a capability to transfer data at a first speed. In one embodiment, the first speed is 10 gigabits per second (GBpS). In other embodiments, another speed may be used. CSP system 110 may be operated by an organization such as a CSP to provide computing resources to customers (with each customer including one or more users). CSP system 110 comprises one or more servers, storage devices, communications networks, network fabrics, interconnects, network interface cards, switches, routers, etc. CSP system 110 includes CSP network fabric 112 to provide an internal communications capability between components in the CSP system. CSP network fabric 112 interfaces with gateway 114 over external access communications link 142. In an embodiment, CSP network fabric 112 is implemented by a software-defined data center fabric networking technology. In an embodiment, external access communications link 142 provides a capability to transfer data at the first speed. Gateway 114 routes information (e.g., network packets) from user computing systems 104 to one or more workload containers 116 over internal access communications link 144 (that is, accesses within CSP system 110). In an embodiment, internal access communications link 144 provides a capability to transfer data at a second speed, the second speed being faster than the first speed. In an embodiment, the second speed is 100 GBpS (and thus 10X faster than the first speed). In other embodiments, other speeds may be used (e.g., second speed 2X faster than the first speed, second speed 5X faster than the first speed, and so on).

Sync controller 220 interfaces with gateway 114 and workload container 116 to improve synchronization processing as described further below.

A workload container 116 executes one or more user workload applications 118. User workload application 118 interacts with one or more applications (not shown) in user computing systems 104 over the aforementioned communication links 140, 142, and 144. User workload application 118 may include any one or more computing functions. In an embodiment, the one or more computing functions may be an artificial intelligence (AI) function, an ML function, a deep learning function, a neural network, or any other function which processes large amounts of data. While processing such functions, user workload application 118 reads data from and/or writes data to data storage 124.

Workload container 116 is coupled to CSP network fabric 112 over internal access communications link 146. Data storage 124 is coupled to CSP network fabric 112 over internal access communications link 148. Thus, user workload application 118 can access data stored in data storage 124 over internal access communications links 146, 148. In an embodiment, internal access communications links 146, 148 provide a capability to transfer data at the second speed. In other embodiments, other speeds may be used.

Workload container 116 and data storage 124 operate logically within virtualized resources layer 132. In an embodiment, virtualized resources layer 132 is a container platform, which may provide for, e.g., deployment, orchestration, and management for containerized applications. Services provided by virtualized resources layer 132 are available to customer computing systems 102 and user computing systems 104.

Workload container 116 is implemented by distributed compute engine 120. In an embodiment, a compute engine is a processing system including a processor. In an embodiment, distributed compute engine helps schedule workload containers 116 across compute servers 122 in CSP system 110. For example, if there are N compute servers 122 and M workloads (with N and M being natural numbers), distributed compute engine 120 distributes the M workloads consistently across the N compute servers. If a compute server becomes unavailable or exhibits performance issues, distributed compute engine 120 re-distributes the workloads from the problem compute server to another available compute server.

Data storage 124 is implemented by distributed data storage 126. ML workloads in user workload applications 118 typically process large amounts of data. The data could be a mix of structured data and unstructured data. In some cases, this data is used by user workload applications to refine and create ML models. As customer's requirements evolve and their ML models change, the ML models need to be re-trained. This means the data is frequently being updated in and/or added to data storage 124. In an embodiment, a data fabric service provides a computing platform for holding the distributed data storage 126 using Apache Hadoop distributed file system (HDFS) and/or network file system (NFS) features.

Distributed compute engine 120 and distributed data storage 126 operate logically within virtualization layer 134.

At hardware layer 136, one or more compute servers 122 implement distributed compute engine 120, and one or more storage servers 128 and one or more physical storage devices 130 implement distributed data storage 126. In an embodiment, compute servers 122 run any version or variation of the Linux™ operating system.

In some examples, CSP system 110 may be provided to the customer to run user workload applications 118 and use capabilities of CSP system 110, such as the capabilities of the layers 132, 134, 136, in a pay-per-use model at the edge, in colocations, and in the customer's data center.

As user workload application 118 is executed by distributed compute engine 120, the user workload application creates greenfield data, which is efficiently stored in data storage 124 over high-speed internal access communications links 146, 148. However, a user may also require user workload application 118 to process brownfield data that already exists in user computing system 104 and/or customer computing system 102. If the entire set of brownfield data (or a large portion of the brownfield data) is pushed by user command (e.g., by using a copy command) from user computing system 104 to CSP system 110 over first (e.g., low) speed external access communications links 140, 142, system performance will suffer.

Figure 2:
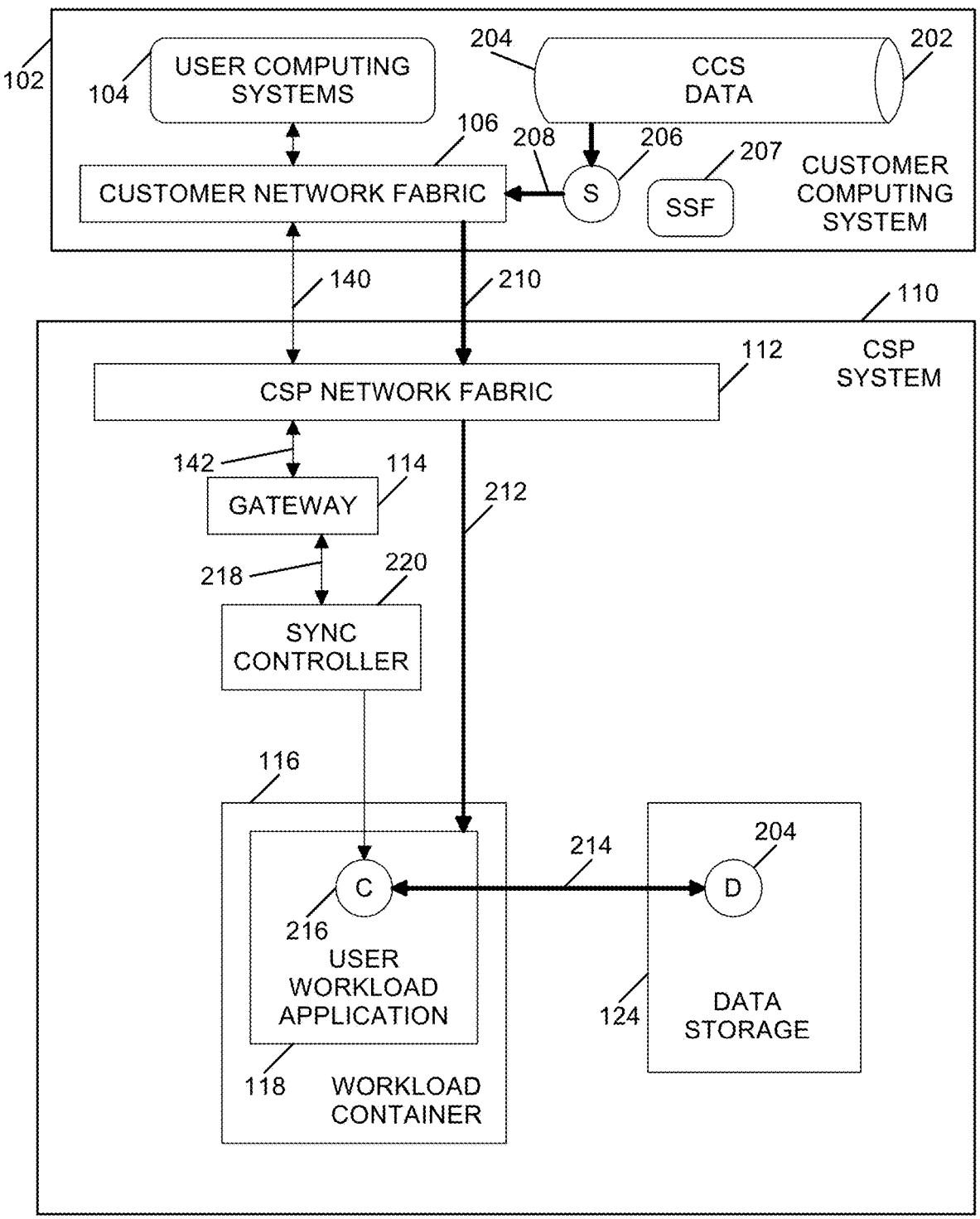
FIG. 2 is a diagram of a logical computing system architecture for synchronizing user data according to some embodiments.

FIG. 2 is a diagram of a logical system 200 for synchronizing user data according to some embodiments. Customer computing system (CCS) data 202 is stored within customer computing system 102. In one embodiment, CCS data 202 comprises user data, such as brownfield data. For purposes of explanation, assume a selected portion of brownfield data called D 204 is to be imported to data storage 124 in CSP system 110. Once data D 204 is stored in data storage 124, user workload application 118 can efficiently use data D 204 for high-speed processing. In embodiments, sync controller 220 is used to coordinate and manage the transfer of data D 204. Sync client C 216 in user workload application 118 is configured to pull and synchronize data D 204 from sync server S 206 in customer computing system 102. Sync server S 206 is coupled to storage holding CCS data 202 over a communications link having the second speed. In an embodiment, sync server 206 is configured by commands in sync server file (SSF) 207. In some embodiments, sync controller 220 pulls data D 204 not over first (e.g., low) speed communications links 140, 142, and 218, but over second (e.g., high) speed external communications links 208, 210, and 212. Sync client C 216 running in workload container 116 stores data D 204 in data storage 124 over communications link 214 at the second (e.g., high) speed. As data D 204 changes over time, sync controller 220 ensures that the copies of data D 204 in CCS data 202 on customer computing system 102 and in data storage 124 on CSP system 110 are synchronized.

In one embodiment, instead of brownfield user data D 204 in CCS data 202 being synchronized, data D 204 may comprise one or more code images. For example, data D 204 may be a code image of a version of an operating system (OS), and the OS version is synchronized by sync controller 220 between the customer computing system 102 and the workload container 116 on the CSP system 110. In some implementations, the code image may be stored in data storage 124.

In one embodiment, sync controller 220 may utilize a synchronization utility, such as, for example, the open source remote synchronization utility called "rsync" to synchronize data between remote and local systems in a secure and incremental manner. For example, rsync supports using a secure shell "ssh" to securely transfer files between systems across networks and can synchronize to a folder mounted locally (such as a network file system (NFS) share). In other embodiments, other mechanisms for file synchronization may be used. For example, other synchronization utilities available as open source software include Syncthing, FreeFileSync, Duplicati, Rclone, and others.

The use of rsync alone does not solve the problem of overloading the compute workload network (e.g., CSP network fabric 112) with a large volume of brownfield data transfer traffic. Further, rsync alone does not provide an automated solution for data transfers that interfaces with an alerting system when errors occur.

Figure 3:
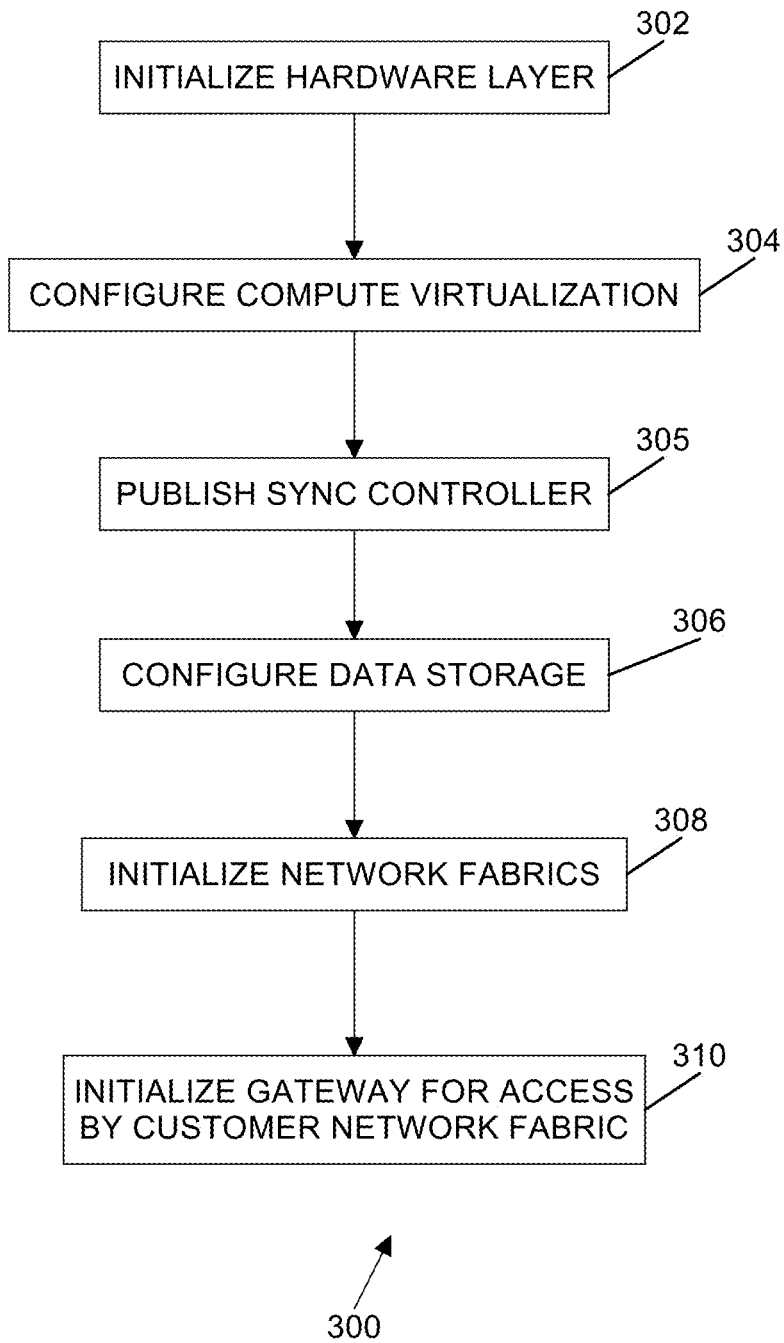
FIG. 3 is a flow diagram of initializing data synchronization processing according to some embodiments.

FIG. 3 is a flow diagram of processing 300 for initializing data synchronization processing according to some embodiments. At block 302, CSP system 110 initializes hardware layer 136. At block 304, CSP system 110 configures compute virtualizations. This includes initializing distributed compute engine 120 of virtualization layer 134 and workload container(s) 116 of virtualized resources layer 132. This also includes enabling an application store for access by users. The application store provides applications for users to access in virtualized resources layer 132 on CSP system 110. At block 305, CSP system 110 publishes an application image of sync controller 220 to be used for synchronizing CCS data 202. At block 306, CSP system 110 initializes distributed data storage (DBDS) 126 of virtualization layer 134, followed by data storage 124 of virtualization resources layer 132. CSP system 110 also enables virtualized file system accesses. At block 308, CSP system 110 initializes the network fabrics by configuring CSP network fabric 112 and customer network fabric 106. At block 310, CSP system 110 initializes gateway 114 for access by customer network fabric 106.

Figure 4:
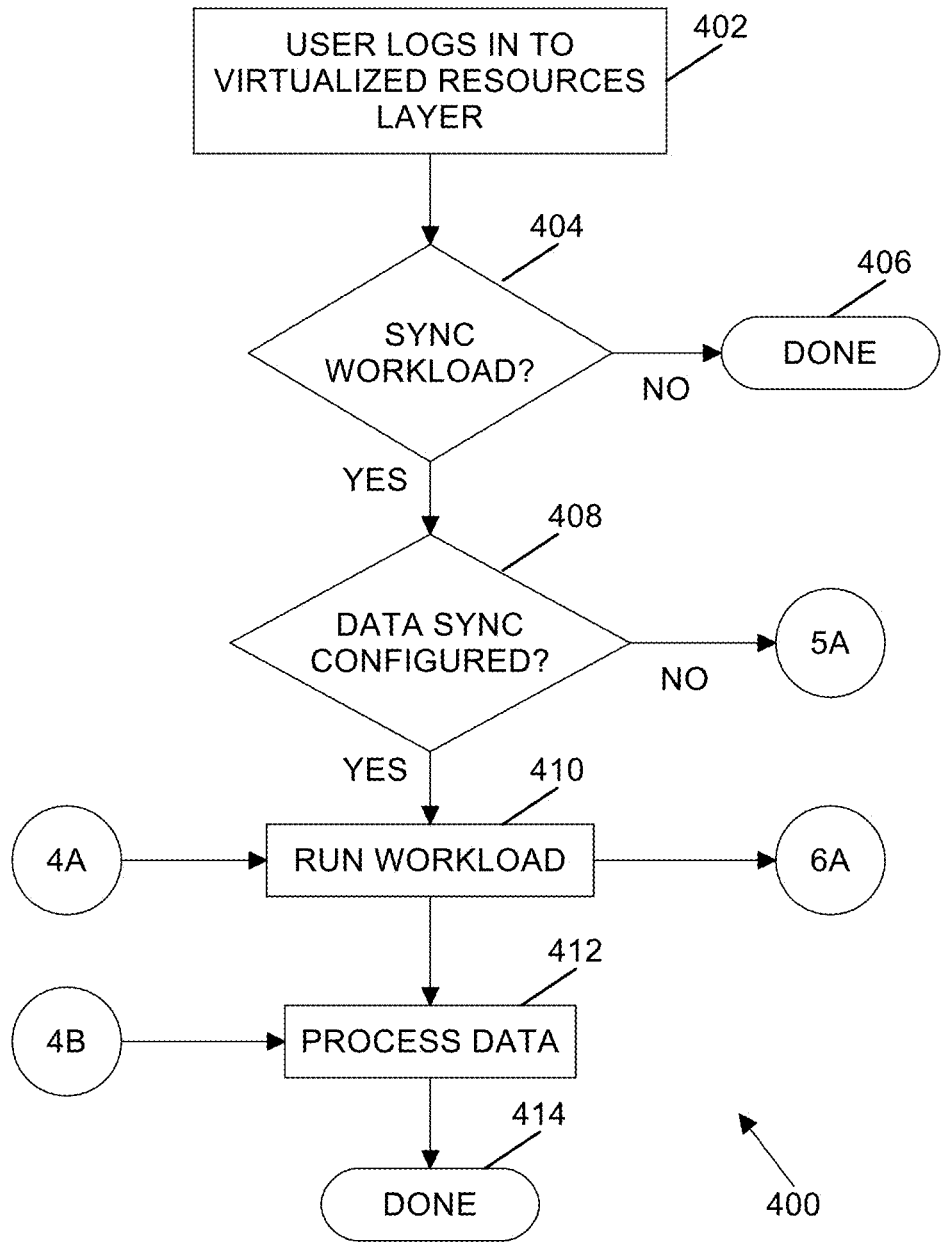
FIG. 4 is a flow diagram of processing for synchronizing user data according to some embodiments.

FIG. 4 is a flow diagram of processing 400 for synchronizing user data 202 according to some embodiments. In an embodiment, a user (such as a customer system administrator) logs on to a setup function in CSP system 110 for managing user workloads and, in one embodiment, configures data synchronization processing using a synchronization utility (e.g., rsync) over a secure shell (ssh). At block 402, a user operating user computing system 104 logs in to virtualized resources layer 132. In an embodiment, the user uses a cryptographic key pair to ssh into workload container 116. In some embodiments, virtualized resources layer 132 provides a unique and secure cryptographic key pair for each workload project created by a user. This allows for secure shell access to one or more workload containers in a project (including securing data transfers between the customer computing system 102 and CSP system 110). At block 404, if user workload application 118 (using sync controller 220) needs to synchronize CCS data, then processing continues with block 408. In an embodiment, CCS data 202 is synchronized with the user data stored on data storage 124 whenever CCS data 202 is changed.

In an embodiment, the user configures data synchronization parameters. Since the user controls the lifecycle of brownfield data, the user can manually trigger a data synchronization when the user knows the data has changed. Alternatively, the user configures a recurring configuration job that periodically runs data synchronization processing. As the data synchronizations of the rsync job are incremental, there is little system performance penalty to running the rsync job frequently. If there is nothing to synchronize, the rsync job is completed with minimal overhead.

If no synchronization is needed at block 404, no data synchronization processing is performed and processing ends at block 406. At block 408, if data synchronization is not yet configured, processing continues on FIG. 5 via connector 5A where the user configures sync client 216 to pull and sync user data (e.g., data D 204) from CCS data 202 via sync server 206. In an embodiment, this is done by manually configuring customer computing system 102 to serve user data (e.g., brownfield data) over a secure ssh endpoint to CSP system 110.

Figure 5:
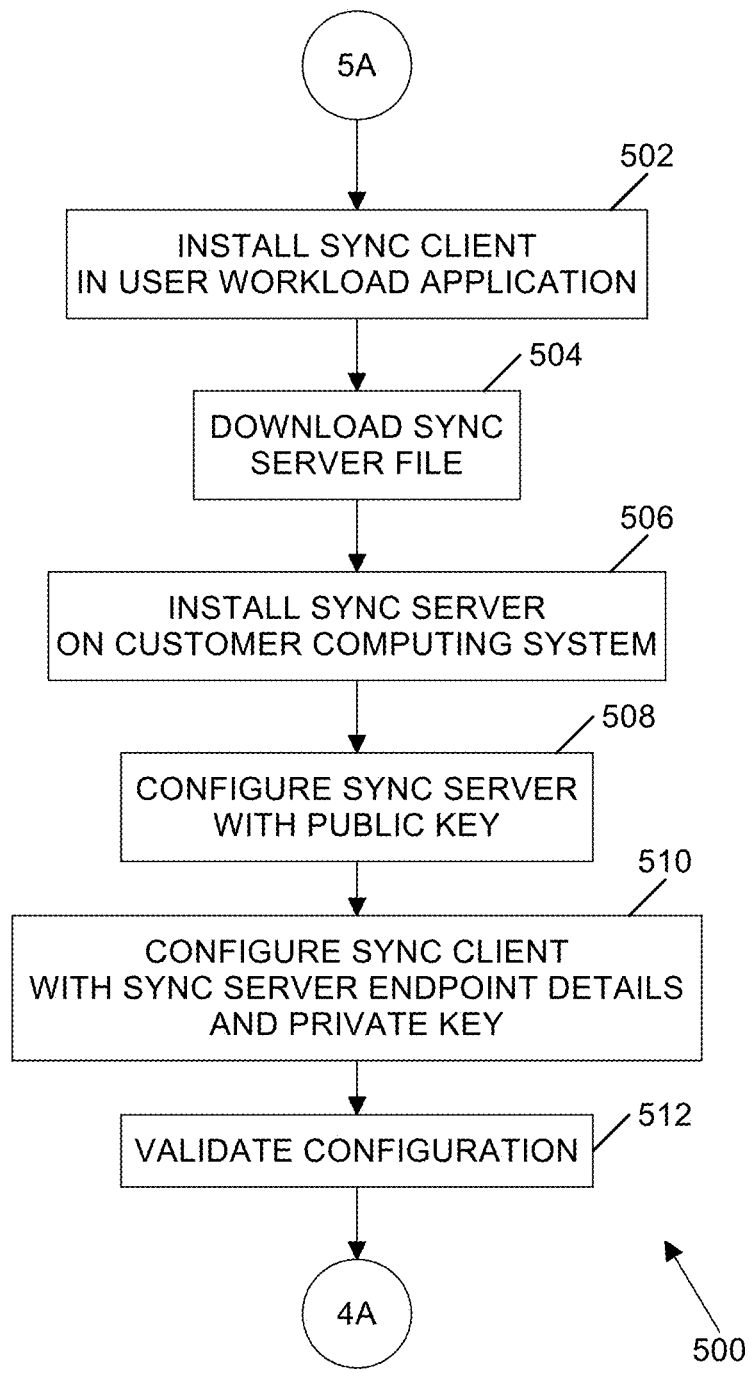
FIG. 5 is a flow diagram of processing for configuring user data synchronization according to some embodiments.

FIG. 5 is a flow diagram of processing 500 for configuring user data synchronization according to some embodiments. The processing of FIG. 5 describes a data sync configuration phase. At block 502, the user directs sync controller 220 to install sync client 216 as an "add-on" (e.g., a plugin) to user workload application 118. In an embodiment, sync client 216 is obtained from an application store provided by CSP system 110. At block 504, to reduce the manual steps involved with data sync configuration, the user downloads a sync server file (SSF) 207 from virtualized resources layer 132 of CSP system 110 to user computing system 104 or customer computing system 102. This file, when built and tagged, provides the image that abstracts the logic to run a secure server shell with rsync on a higher numbered port and trusts data transfer requests corresponding to a public key of a cryptographic key pair. In an embodiment, CSP system provides one or more sync server files 207 to assist users with data synchronization configuration.

In an embodiment, sync server file 207 comprises a text document (e.g., a script or list of automatic executable instructions) that contains commands a user could manually enter on a command line (e.g., of a ssh) to assemble an image. In an embodiment, a tagging mechanism may be used to make sure a known good and/or stable version of the container image (e.g., software) is used. If there are improvements and/or changes to the image, a new tag will be created. In this way, the user can choose what version (based on the tag) of the container image to be used.

At block 506, the user directs sync controller 220 to install sync server 206 into user computing system 104 or customer computing system 102. Sync server 206 accesses CCS data 202 on customer computing system 102. At block 508, the user instructs sync controller 220 to configure sync server 206 with a public key of a cryptographic key pair. In one example, the public key of the cryptographic key pair is copied to the customer computing system 102. The private key of the cryptographic key pair is provided to sync client 216.

At block 510, the user instructs sync controller 220 to configure sync client 216 with endpoint details of sync server 206 and the private key of the cryptographic key pair. In an embodiment, the endpoint details include a host name of the customer computing system 102 hosting CCS data 202. The host name may include the domain name server (DNS) host name or an Internet Protocol (IP) address and port combination. At block 512, sync controller 220 validates the configuration of the sync client 216 and sync server 206. If the configuration is invalid, an alert is generated and sync processing is terminated. If the configuration is valid, processing returns to block 410 of FIG. 4 via connector 4A.

Returning to FIG. 4, at block 410, CSP system 110 runs user workload application 118. In an embodiment, data synchronization is also performed in the background and in parallel with execution of the user workload application 118. This processing is represented in FIG. 4 as connector 6A, which leads to the processing of FIG. 6.

Figure 6:
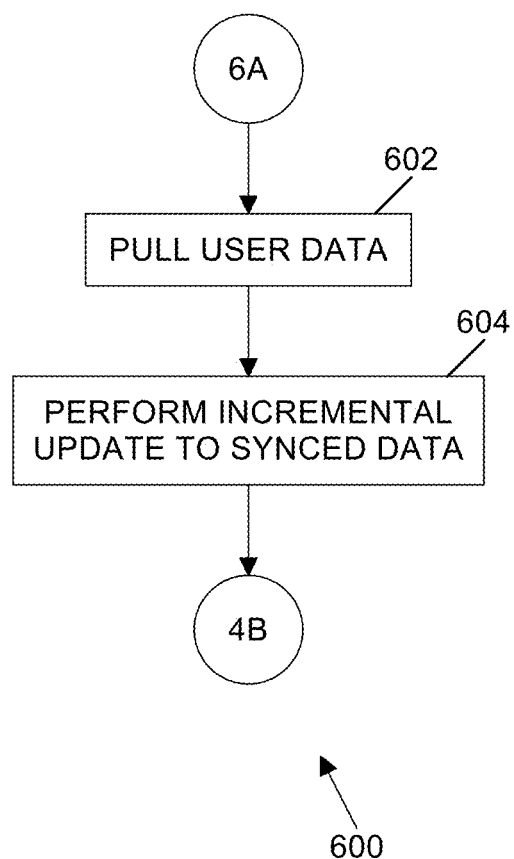
FIG. 6 is a flow diagram of processing for incrementally synchronizing user data according to some embodiments.

FIG. 6 is a flow diagram 600 of processing for incrementally synchronizing user data according to some embodiments. The processing of FIG. 6 describes an incremental data sync phase. In an embodiment, sync controller 220 performs data synchronization of user data in the background (e.g., in a task other than the task executing user workload application 118 and running in parallel on distributed compute engine 120). In an embodiment, initializing and periodically running data synchronization may be performed using a job running in virtualized resources layer 132 that calls the synchronization utility (e.g., rsync) to sync CCS data 202 on customer computing system 102 to data storage 124 on CSP system 110.

At block 602, sync controller 220 controls pulling at least a selected portion of CCS data 202 (e.g., user data such as brownfield data, a code image, etc.) from sync server 206 on customer computing system 102 by sync client 216 on CSP system 110 over link 210, CSP fabric 112, and link 212 into user workload application 118. In an embodiment, the selected portion is that part of the CCS data 202 that is not in sync with the data 204 stored in data storage 124. In an embodiment, the selected portion of the CCS data is encrypted with the public key of the cryptographic key pair prior to transfer over customer network fabric 106 and CSP network fabric 112 and decrypted by sync client 216. Sync client 216 then at block 604 performs an incremental update to sync data on data storage 124 in distributed data storage 126. Data in data storage 124 for the user now includes the decrypted and updated (e.g., synced) CCS data 202 (e.g., brownfield data) as well as greenfield data. Processing returns via connector 4B to FIG. 4. At block 412 of FIG. 4, user workload application 118 processes the updated and synced data from data storage 124 until completion at block 414.

Figure 7:
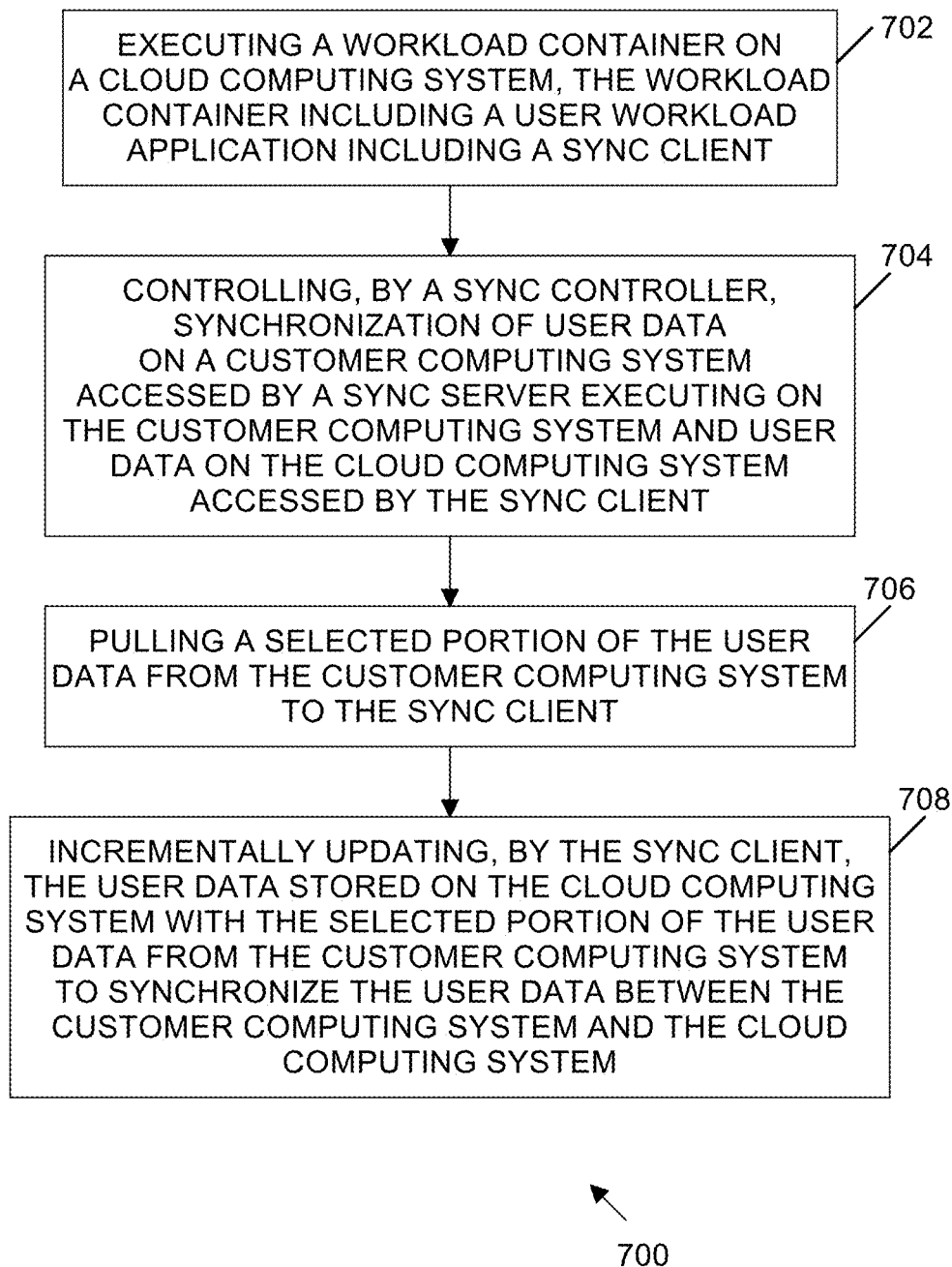
FIG. 7 is a flow diagram of a process for synchronizing user data between a sync client and a sync server on a customer computing system.

FIG. 7 is a flow diagram 700 of a process for synchronizing user data between a sync client and a sync server on a customer computing system. The process includes executing, at block 702, by a processing system on a cloud computing system, a workload container, the workload container including a user workload application, the user workload application including a sync client. The process includes controlling, at block 704, by a sync controller, synchronization of user data on a customer computing system accessed by a sync server executing on the customer computing system and user data on the cloud computing system accessed by the sync client, and at block 706, pulling a selected portion of the user data from the customer computing system to the sync client. The process includes incrementally updating, at block 708, by the sync client, the user data stored on the cloud computing system with the selected portion of the user data from the customer computing system to synchronize the user data between the customer computing system and the cloud computing system.

At any time during the processing described above in FIGS. 3 through 7, alerts may be generated by workload container 116 when errors occur. In an embodiment, the alerts are stored in one or more log files. Log files may be captured and sent to a centralized logging system in CSP system 110. The centralized log management system supports log alerting by looking for specific patterns in the log data and turning found patterns into pager duty alerts, for example. For instance, the following log pattern may be set up to generate an alert whenever sync controller 220 fails due to network issues: Host: "<<workload container hostname>>" AND message: "Partial transfer due to vanished source files"

Embodiments solve the problem of synchronizing big brownfield data sets between systems. Embodiments abstract away the complexity of data management from customers so that they can better focus on their problem domain—such as data sciences, machine learning modelling and training, parallelizing complex high-performance jobs, etc. Embodiments provide managed security since the user does not have to remember complex passwords and password rotation. The automatically generated cryptographic key pair abstracts the complexity in performing a secure handshake between the source and destination systems for brownfield data.

The processing described above with reference to FIGS. 3 through 7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or nodes of various forms, such as the systems described above with reference to FIGS. 1 and 2, or the nodes described below with reference to FIGS. 8 and 9.

Embodiments described herein include various steps, examples of which have been described above. As described further above, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

Figure 8:
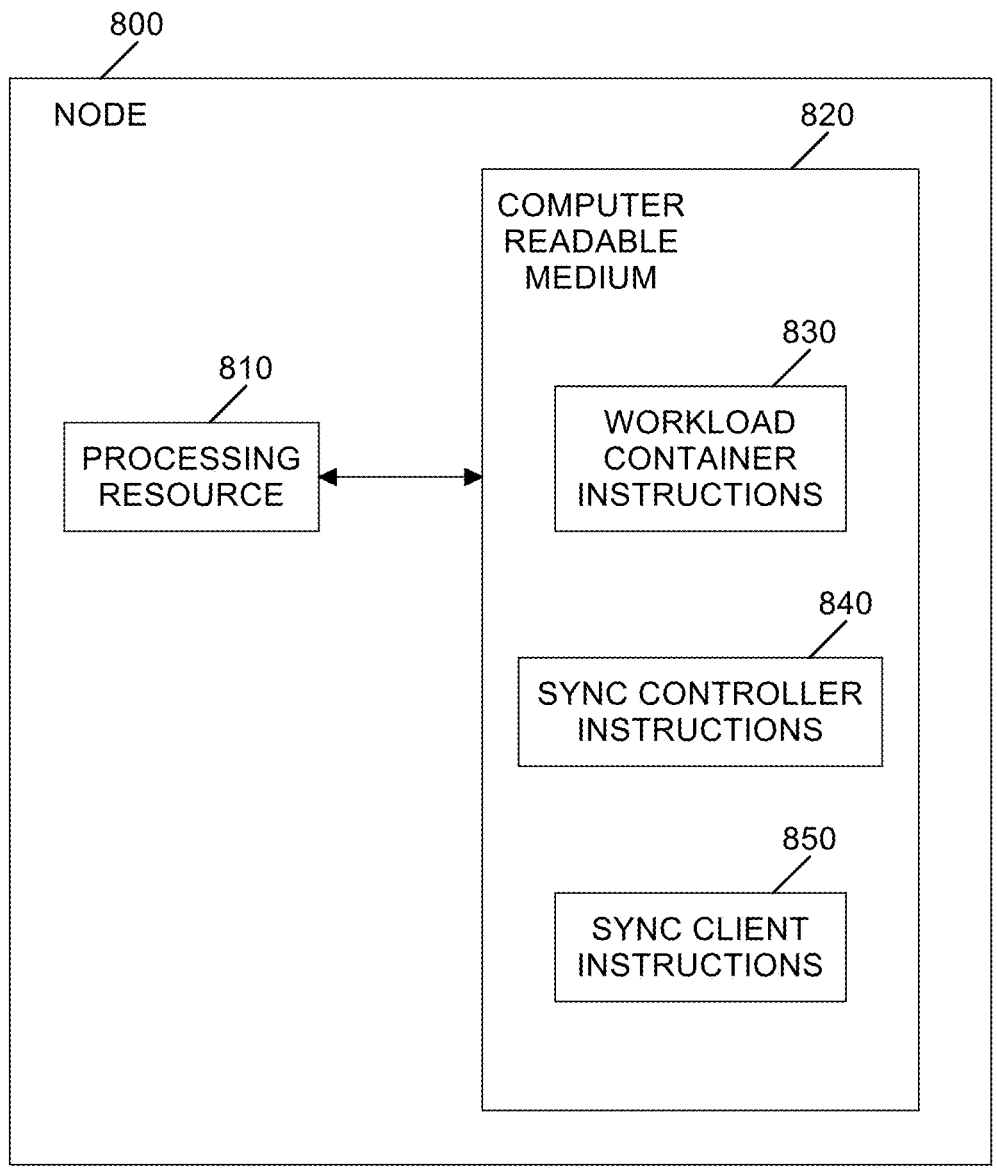
FIG. 8 is a block diagram of a processing node of a distributed system in accordance with an embodiment.

FIG. 8 is a block diagram of a processing node 800 of a distributed system (such as any component (e.g., customer computing system 102 and/or CSP system 110) of computing system architectures 100 and 200) in accordance with an example embodiment. In the simplified example illustrated by FIG. 8, node 800 includes a processing resource 810 coupled to a non-transitory, machine readable medium 820 encoded with instructions to maintain service availability for a distributed system. The processing resource 810 may include a microcontroller, a microprocessor, central processing unit core(s), an ASIC, an FPGA, and/or other hardware device suitable for retrieval and/or execution of instructions from the machine readable medium 820 to perform the functions related to various examples described herein. Additionally, or alternatively, the processing resource 810 may include electronic circuitry for performing the functionality of the instructions described herein.

The machine readable medium 820 may be any medium suitable for storing executable instructions. Non-limiting examples of machine readable medium 820 include RAM, ROM, EEPROM, flash memory, a hard disk drive, an optical disc, or the like. The machine readable medium 820 may be disposed within node 800, as shown in FIG. 8, in which case the executable instructions may be deemed "installed" or "embedded" on node 800. Alternatively, the machine readable medium 820 may be a portable (e.g., external) storage medium, and may be part of an "installation package." The instructions stored on the machine readable medium 820 may be useful for implementing at least part of the methods described herein.

As described further herein below, the machine readable medium 820 may have stored thereon a set of executable instructions 830, 840 and 850. It should be understood that part or all of the executable instructions and/or electronic circuits included within one box may, in alternate implementations, be included in a different box shown in the figures or in a different box not shown. In some implementations, the machine readable medium 820 may include other instructions not shown to perform other functions described herein, such as establishing a write weight or an election timeout.

Instructions 830, upon execution, cause the processing resource 810 to perform workload container 116 processing. In an embodiment, workload container processing includes executing, by a processing system on a cloud computing system, a workload container, the workload container including a user workload application, the user workload application including a sync client. Instructions 840, upon execution, cause the processing resource 810 to perform sync controller 220 processing. In an embodiment, sync controller processing includes controlling, by a sync controller, synchronization of user data on a customer computing system accessed by a sync server executing on the customer computing system and user data on the cloud computing system accessed by the sync client; and pulling a selected portion of the user data from the customer computing system to the sync client. Instructions 850, upon execution, cause the processing resource 810 to perform sync client 216 processing. In an embodiment, sync client processing includes incrementally updating, by the sync client, the user data stored on the cloud computing system with the selected portion of the user data from the customer computing system to synchronize the user data between the customer computing system and the cloud computing system.

Figure 9:
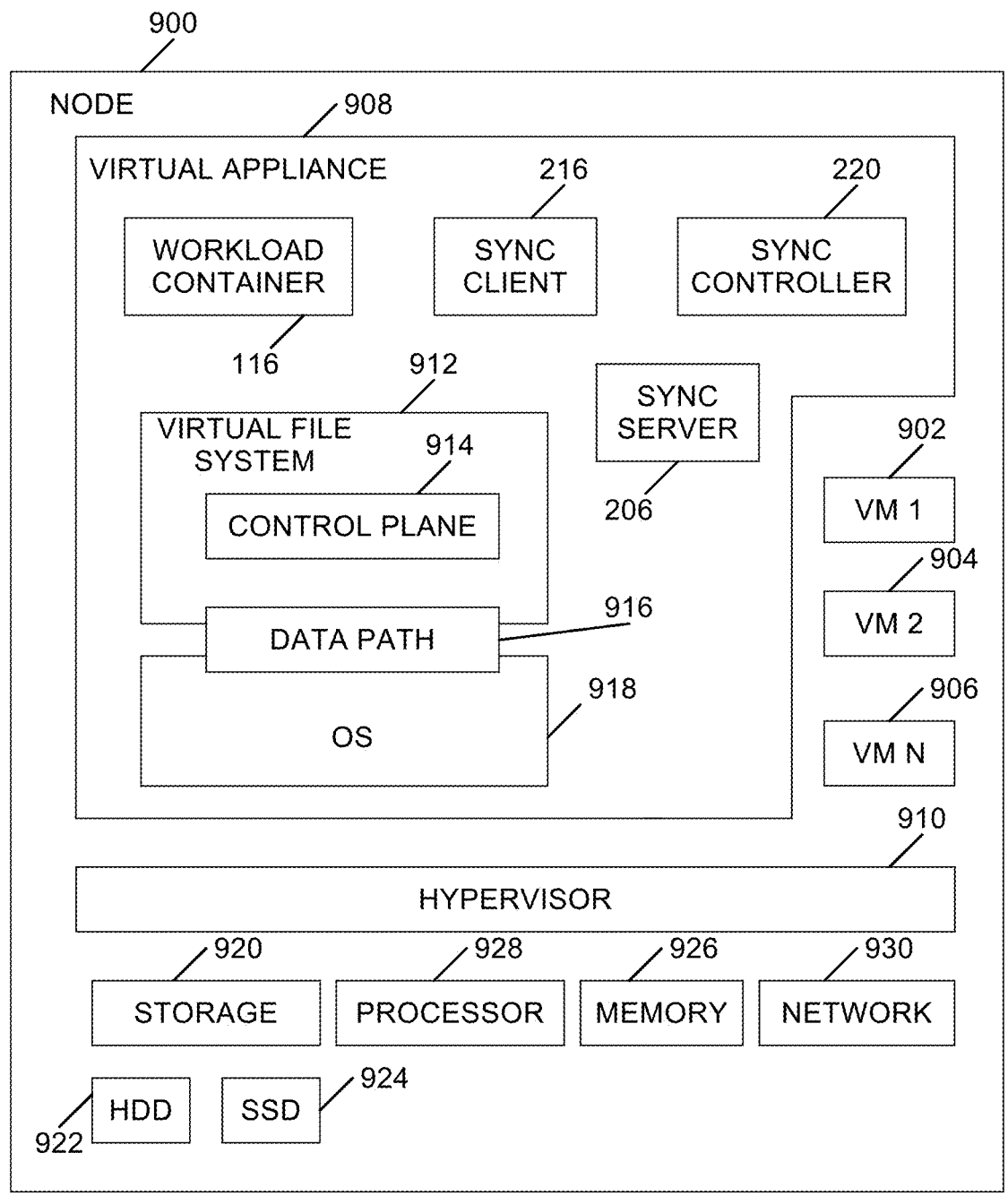
FIG. 9 is a block diagram illustrating a processing node of a distributed system in accordance with an embodiment.

FIG. 9 is a block diagram illustrating a node 900 that may represent the nodes of a distributed system (such as any component (e.g., customer computing system 102 and/or CSP system 110)) in accordance with an embodiment. In the context of the present example, node 900 has a software-centric architecture that integrates compute, storage, networking and virtualization resources and other technologies.

Node 900 may be implemented as a physical server (e.g., a server having an x86 or x64 architecture) or other suitable computing device. In the present example, node 900 hosts a number n of guest virtual machines (VM) 902, 904 and 906 (n being a natural number) and can be configured to produce local and remote backups and snapshots of the virtual machines. In some embodiments, multiple of such nodes, each performing workload container 116, sync controller 220, sync client 216, and sync server 206 processing (such as that described above in connection with FIGS. 1 through 7), may be coupled to a network and configured as part of a cluster. In an embodiment, workload container 116 includes sync client 216. Depending upon the particular implementation, one or more services supported by the distributed system may be related to VMs 902, 904 and 906 or may be unrelated.

Node 900 can include a virtual appliance 908 above a hypervisor 910. Virtual appliance 908 can include a virtual file system 912 in communication with a control plane 914 and a data path 916. Control plane 914 can handle data flow between applications and resources within node 900. Data path 916 can provide a suitable Input/Output (I/O) interface between virtual file system 912 and an operating system (OS) 918, and can also enable features such as data compression, deduplication, and optimization. According to one embodiment the virtual appliance 908 represents a virtual controller configured to run storage stack software (not shown) that may be used to perform functions such as managing access by VMs 902, 904 and 906 to storage 920, providing dynamic resource sharing, moving VM data between storage resources 922 and 924, providing data movement, and/or performing other hyperconverged data center functions.

Node 900 can also include a number of hardware components below hypervisor 910. For example, node 900 can include storage 920 which can be Redundant Array of Independent Disks (RAID) storage having a number of hard disk drives (HDDs) 922 and/or solid-state drives (SSDs) 924. Node 900 can also include memory 826 (e.g., random-access memory (RAM), read-only memory (ROM), flash, etc.) and one or more processors 928. Lastly, node 900 can include wireless and/or wired network interface components to enable communication over a network 930 (e.g., with other nodes or with the Internet).

In the foregoing description, numerous details are set forth to provide an understanding of the subject matter disclosed herein. However, implementation may be practiced without some or all these details. Other implementations may include modifications and variations from the details discussed above. It is intended that the following claims cover such modifications and variations.

What is claimed is:

1. A cloud computing system comprising:
a processing system, comprising one or more processors, to execute a workload container, the workload container including a user workload application, the user workload application including a synchronization (sync) client, wherein the user workload application interacts with a user computing system of a customer computing system over a first communication link between the customer computing system and the cloud computing system, the first communication link having a first speed;
a data storage system, coupled to the processing system, to store user data in the cloud computing system, wherein the user data comprises greenfield data generated by the user workload application and a copy of brownfield data from the customer computing system; and
a sync controller configured to:
control synchronization of the brownfield data and the copy of the brownfield data between the sync client and a sync server executing on the customer computing system; and pull a selected portion of the brownfield data from the customer computing system to the sync client, wherein:
- the selected portion is a portion of the brownfield data that is not yet synchronized with the copy of the brownfield data in the user data stored in the data storage system of the cloud computing system,
- the sync controller pulls the selected portion of the brownfield data from the customer computing system to the data storage system of the cloud computing system over a second communication link between the customer computing system and the cloud computing system that has a second speed that is higher than the first speed,
- the sync client incrementally updates the user data stored on the data storage system with the selected portion of the brownfield data to synchronize the brownfield data between the customer computing system and the cloud computing system, and
- the user workload application executes, at least in part, by processing the greenfield data and the copy of the brownfield data in the data storage system of the cloud computing system after the copy of the brownfield data is synchronized with the selected portion from the customer computing system over the second communication link.

2. The cloud computing system of claim 1, wherein the user data comprises a code image.

3. The cloud computing system of claim 1, wherein the sync controller is further to:
configure synchronization of the user data by installing the sync client in the user workload application;
install the sync server on the customer computing system;
configure the sync server with a public key of a cryptographic key pair configure the sync client with a private key of the cryptographic key pair; and
validate the synchronization configuration.

4. The cloud computing system of claim 3, wherein the sync server is configured to encrypt the selected portion of the brownfield data with the public key prior to transfer of the selected portion of the brownfield data from the customer computing system, and the sync client decrypts the selected portion of the brownfield data prior to incrementally updating the user data stored on the data storage system.

5. The cloud computing system of claim 1, wherein the sync controller is further configured to control synchronization of the brownfield data between the sync client and the sync server when the brownfield data changes on the customer computer system.

6. The cloud computing system of claim 1, wherein the sync controller is accessible by a secure shell (ssh) and the sync controller uses a remote synchronization (rsync) function to synchronize the user data.

7. A method, comprising:
executing, by a processing system on a cloud computing system, a workload container, the workload container including a user workload application, the user workload application including a synchronization (sync) client, wherein the user workload application interacts with a user computing system of a customer computing system over a first communication link between the customer computing system and the cloud computing system, the first communication link having a first speed;
controlling, by a sync controller, synchronization of brownfield data on the customer computing system accessed by a sync server executing on the customer computing system and a copy of the brownfield data on the cloud computing system accessed by the sync client, wherein the copy of the brownfield data is included in user data stored on a data storage system of the cloud computing system that also includes greenfield data generated by the user workload application;
pulling a selected portion of the brownfield data from the customer computing system to the sync client, wherein:
- the selected portion of the brownfield data is a portion of the brownfield data that is not yet synchronized with the copy of the brownfield data of the cloud computing system, and
- the pulling of the selected portion of the brownfield data is performed over a second communication link between the customer computing system and the cloud computing system that has a second speed that is higher than the first speed;
incrementally updating, by the sync client, the user data stored on the cloud computing system with the selected portion of the brownfield data from the customer computing system to synchronize the brownfield data between the customer computing system and the cloud computing system; and
executing, at least in part, the user workload application by processing the greenfield data and the copy of the brownfield data in the data storage system of the cloud computing system after the copy of the brownfield data is synchronized with the selected portion from the customer computing system over the second communication link.

8. The method of claim 7, further comprising:
configuring synchronization of the user data by installing the sync client in the user workload application;
installing the sync server on the customer computing system;
configuring the sync server with a public key of a cryptographic key pair;
configuring the sync client with a private key of the cryptographic key pair; and
validating the synchronization configuration.

9. The method of claim 8, further comprising:
encrypting, by the sync server, the selected portion of the brownfield data with the public key prior to transfer of the selected portion of the brownfield data from the customer computing system, and
decrypting, by the sync client, the selected portion of the brownfield data prior to incrementally updating the user data stored on the data storage system.

10. The method of claim 7, further comprising controlling synchronization of the brownfield data between the sync client and the sync server when the brownfield data changes on the customer computing system.

11. A non-transitory machine-readable storage medium having stored thereon executable instructions that, when executed by a processing resource, cause the processing resource to:
execute, by a processing system on a cloud computing system, a workload container, the workload container including a user workload application, the user workload application including a synchronization (sync) client, wherein the user workload application interacts with a user computing system of a customer computing system over a first communication link between the customer computing system and the cloud computing system, the first communication link having a first speed;

control, by a sync controller, synchronization of brownfield data on the customer computing system accessed by a sync server executing on the customer computing system and a copy of the brownfield data on the cloud computing system accessed by the sync client, wherein the copy of the brownfield data is included in user data stored on a data storage system of the cloud computing system that also includes greenfield data generated by the user workload application;

pull a selected portion of the brownfield data from the customer computing system to the sync client, wherein:
  the selected portion is a portion of the brownfield data that is not yet synchronized with the copy of the brownfield data on the cloud computing system, and
  the pull of the selected portion of the brownfield data is performed over a second communication link between the customer computing system and the cloud computing system that has a second speed that is higher than the first speed;

incrementally update, by the sync client, the user data stored on the cloud computing system with the selected portion of the brownfield data from the customer computing system to synchronize the brownfield data between the customer computing system and the cloud computing system; and execute, at least in part, the user workload application by processing the greenfield data and the copy of the brownfield data in the data storage system of the cloud computing system after the copy of the brownfield data is synchronized with the selected portion from the customer computing system over the second communication link.

* * * * *